Jan. 26, 1960 R. D. LACOE, JR 2,922,335
MAGAZINE SLIDE PROJECTOR WITH SLIDE REVIEW MEANS
Filed Feb. 27, 1956 4 Sheets-Sheet 3
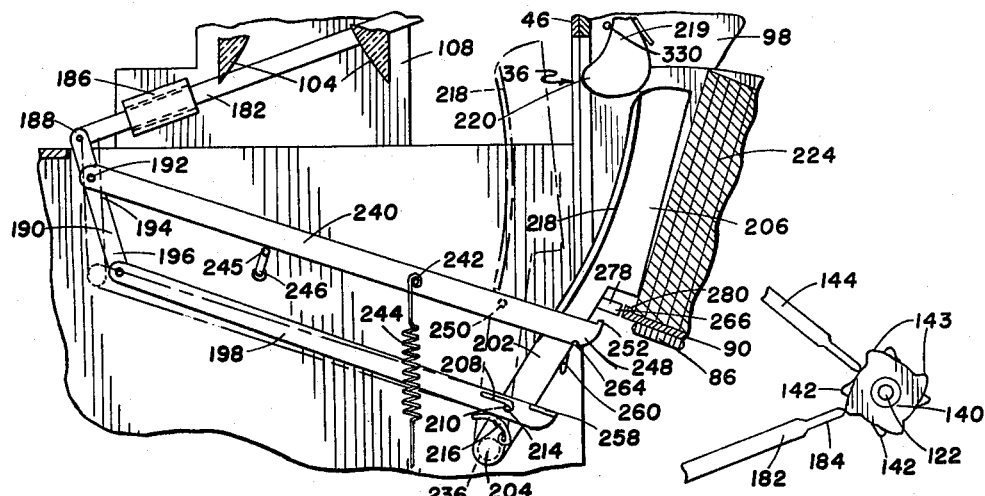
Fig. 6
Fig. 9
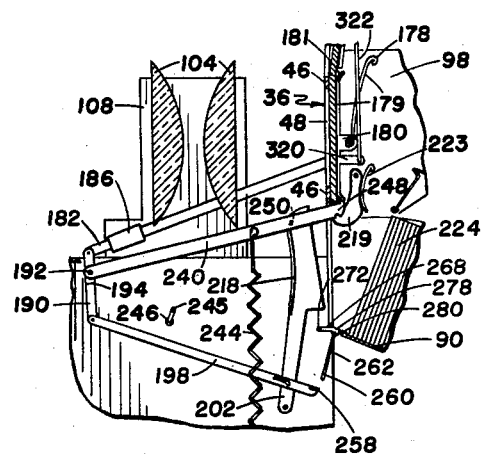
Fig. 7
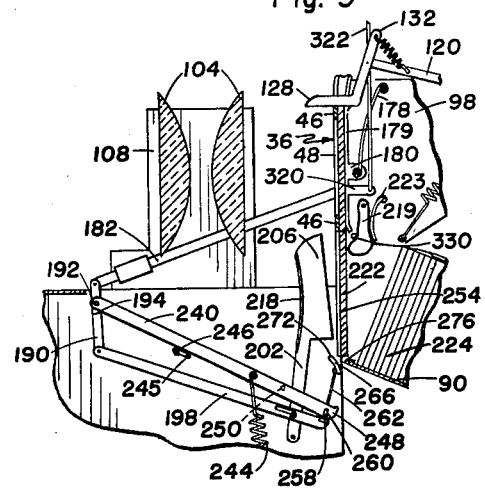
Fig. 8
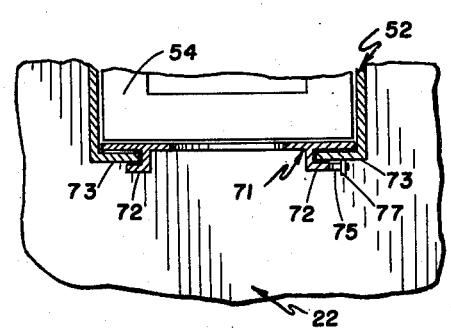
Fig. 14
Fig. 15
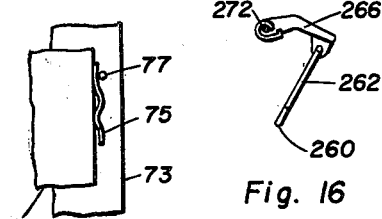
Fig. 16
INVENTOR.
RALPH D. LACOE, JR.
BY
Knox & Knox Jan. 26, 1960   R. D. LACOE, JR   2,922,335
MAGAZINE SLIDE PROJECTOR WITH SLIDE REVIEW MEANS
Filed Feb. 27, 1956   4 Sheets-Sheet 1

INVENTOR.
RALPH D. LACOE, Jr.

BY

Knox & Knox

INVENTOR.
RALPH D. LACOE, JR.

Jan. 26, 1960     R. D. LACOE, JR     2,922,335
MAGAZINE SLIDE PROJECTOR WITH SLIDE REVIEW MEANS
Filed Feb. 27, 1956     4 Sheets-Sheet 4

INVENTOR.
RALPH D. LACOE, Jr.
BY
Knox & Knox

2,922,335

MAGAZINE SLIDE PROJECTOR WITH SLIDE REVIEW MEANS

Ralph D. Lacoe, Jr., San Diego, Calif.

Application February 27, 1956, Serial No. 568,037

20 Claims. (Cl. 88—28)

The present invention relates generally to photographic slide projectors and more particularly to a projector having a novel feeding mechanism, a reviewing mechanism, a restacking mechanism, and means to eject any viewed or reviewed slide.

The primary object of this invention is to provide a projector having improved, sure acting means to urge the slides into a viewing position with great speed and without any tendency to jam.

Another object of this invention is to provide a projector having a novel mechanism to eject a single slide from a magazine, and hold said slide in a position to be moved toward the viewing position at the command of an operator.

Another object of this invention is to provide a projector in which a slide, immediately after having been viewed is moved into a position permitting recall or reviewing by the action of the feeding mechanism on another slide approaching the viewing position.

Another object of this invention is to provide a projector having means to return the slide from said recall or reviewing position to the viewing position so as to allow comparison or selection of slides.

Another object of this invention is to provide a projector having a slide receiving tray, and means to carry each slide from the review position to the said tray, said means also depositing the slides in stacked relation in the tray.

Another object of this invention is to provide a projector which will operate as efficiently with worn or defective slides as with new slides, and which applies no deforming loads to the slides used therein.

Another object of this invention is to provide a projector which is so constructed as to allow the ejection of a slide from the projector.

Another object of this invention is to provide a projector which is adapted for fabrication from many different materials, so that the choice of material can be according to the dictates of availability and price considerations, the exact sizes and proportions being matters easily determined to suit particular conditions and needs.

Another object of this invention is to provide a projector which is practicable and inexpensive to manufacture.

Finally, it is an object to provide a slide projector of the aforementioned character which is simple, safe and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 6 is a greatly enlarged, fragmentary sectional view of the lower portion of the projector, and showing the reviewing, stacking and ejection mechanisms.

Figure 7 is a view similar to Figure 6 and showing the reviewing mechanism in operative position.

Figure 8 is a view similar to Figure 7, but showing the ejection mechanism in operative position.

Figure 9 is a greatly enlarged view of the ratchet cam in position corresponding to the operative position as illustrated in Figure 6, the ejector push rods and stacker operating rods being shown fragmentarily.

Figure 14 is a view of the magazine taken on the line 14—14 of Figure 1.

Figure 15 is a side elevational view of a portion of the magazine.

Figure 16 is a side elevational view of one of the trap doors and its operating link on an enlarged scale.

Figure 1:
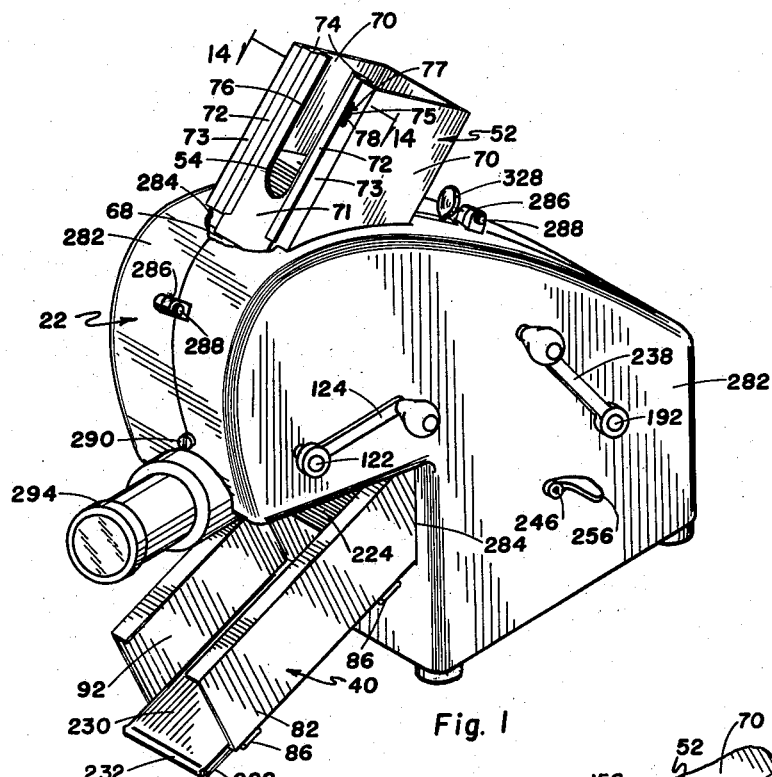
Figure 1 is a fragmentary perspective view of the complete projector, a portion of the housing being broken away to clearly show certain internal parts.

In devices for projection of photographic transparencies, hereinafter referred to as "slides," it is a commonly accepted practice to provide a magazine capable of holding a plurality of the slides in stacked relation therein. A single slide is released from the magazine, and allowed to fall, or is forced into alignment with a viewing aperture. After viewing, the slide is removed from the aperture and placed in a container or drawer within the projector, or in some cases the slide is allowed to fall freely from the viewing aperture into a simple compartment within the projector.

In substantially all the present projection devices, when the cardboard slides which are used become dogeared at the corners through normal wear, or misuse and there is a tendency to jam, or at least a reduction in the efficiency of operation of the device. Similarly, some new slides have slight offsets in the edges thereof, due to inaccuracy of assembly, which tend to catch on various parts of the projection mechanisms or even on the edges of adjacent slides and again causing reduced efficiency of the mechanisms.

Further, in present projectors which force the slides not only into viewing position but also forcibly remove the slides therefrom, the slides are subjected to relatively large impact loads which result in localized wear and distortion of the cardboard.

In many instances, it is desirable to compare slides of similar subject matter in order to choose the most desirable slide for continued use, and reject or remove the less desirable slide or slides. This comparison and rejection usually requires laborious and time-consuming operations, and results in increased wear on the slides under consideration.

The instant invention provides a projector with which these and many other problems encountered in slide projection are solved, or at least slide projection are greatly reduced.

Similar characters of reference indicate similar or identical elements and portions throughout the specification and throughout the views of the drawing.

Referring now to the drawings in detail, the projector is illustrated as comprising a frame assembly 10, a feed assembly 14, a re-stacking assembly 16, a review assembly 18, an ejector assembly 20, and a housing 22, which substantially encloses the assemblies 10, 14, 16, 18, 20.

Frame assembly

Figure 4:
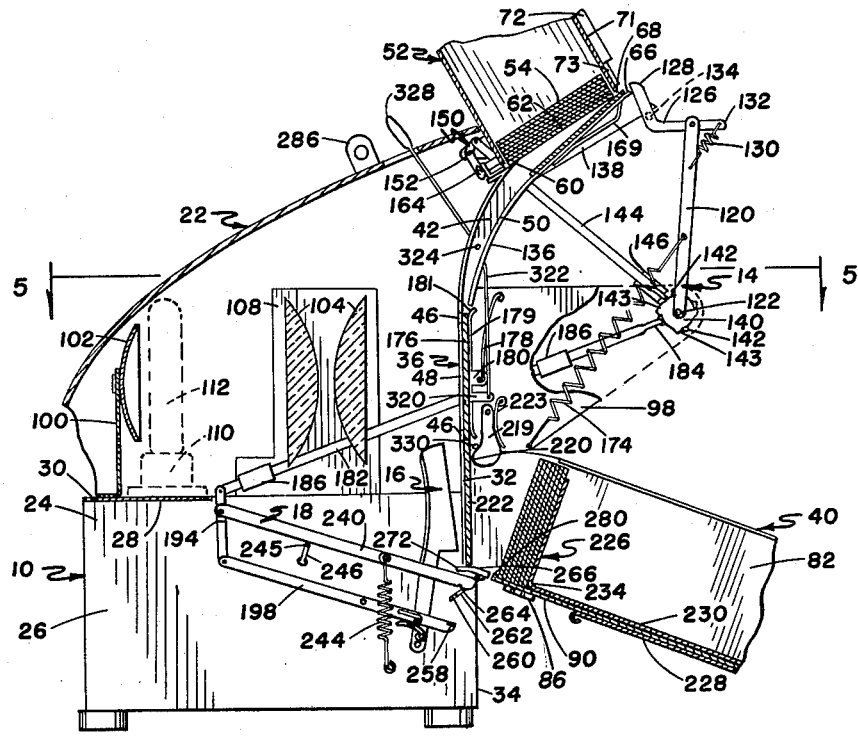
Figure 4 is a vertical, sectional view of the projector, the magazine and receiving tray being shown fragmentarily.

The frame assembly 10, as indicated in Figure 4, includes a body 24 having vertically disposed side panels 26 and a horizontally disposed upper panel 28 interconnecting rear portions of the upper edges 30 of the panels 26. The body 24 is formed of a single piece of sheet metal or the like.

Inwardly extending flanges 32 on the forwardly disposed ends 34 of the side panels 26 provide means of rigid attachment of two parallel guide members 36 extending upwardly therefrom. Each guide member 36 may be formed from a single piece of sheet metal or the like, a lower portion being vertical and planar for attachment to the flange 32. A receiver tray 40 is secured to the lower portions of the guide members 36 and extends forwardly and downwardly. Immediately above the uppermost point of the receiver tray 40, forwardly and upwardly extending flanges 42 are provided on the guide members 36. Horizontal braces 46, vertically spaced between the guide members 36, maintain parallelism therebetween, and define the horizontal boundaries of a viewing aperture or gate 48.

Above the uppermost brace 46, the guide member 36 is curved arcuately, upwardly and forwardly, and is further provided with a guide track defined by opposed flanges 50 extending toward each other from the forwardly disposed edge of the flange 42. The flanges 50 are of slightly different curvature than the arcuate portion of the guide members 36, for reasons which will be fully brought forth hereinafter.

A magazine 52, rectangular in cross-section, is mounted at an angle of 20 degrees to 40 degrees to the vertical at the top of the housing 22 between the guide members 36 to maintain a plurality of slides 54 in stacked relation therein.

Figure 2:
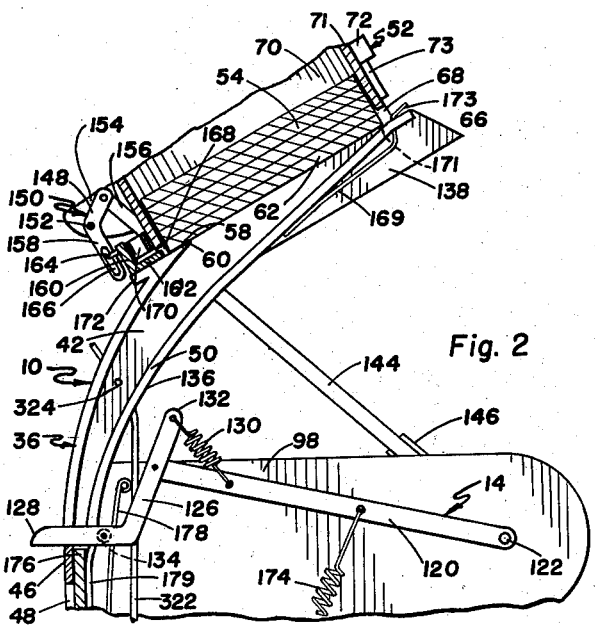
Figure 2 is a greatly enlarged, fragmentary, sectional view of the feed mechanism, the magazine and actuating spring.

The guide members 36 extend slightly inward of the rearwardly disposed edge of the magazine, the upper surfaces 58 of the members 36 being beveled to lie normal to the longitudinal axis of the magazine and to constitute retaining lips 60 on which the lowermost slide 62 rests, all as best illustrated in Figure 2. The guide flanges 50 have portions 66 extending forwardly with the upper surfaces thereof in co-planar relation to the lips 60. The forward edge of the magazine is recessed to provide an exit slot 68 through which the lowermost slide 62 may be partially ejected. The sides 70 of the magazine are in co-planar relationship with the flanges 42.

To allow for the use of slides which are of greater thickness than the conventional slides referred to herein, the forwardly disposed side of the magazine is provided with a slidable panel 71 having longitudinal guide flanges 72 for sliding engagement with inwardly turned, forward flanges 73 of the magazine. Caps 74 secured to the upper ends of the flanges 72 engage the upper end of the flanges 73 when the bottom of the panel 71 is properly positioned to serve as the upper edge of the exit slot 68. When slides of greater thickness are used, the panel 71 is elevated and a detent 78 in a spring 75 mounted on the panel 71 then engages a pin 77 fixed on the adjacent flange 73 to hold the panel 71 in the elevated position, thus increasing the vertical dimension of the slot 68 and allowing the edge portion of a slide of greater thickness to project therethrough during the feeding operation. A thumb slot 76 in the panel 71 allows the operator to retain control of the stacked slides 54 until said slides are deposited on the lips 60.

The previously mentioned receiver tray 40 is generally rectangular in cross-section and is provided with outwardly extended flanges 80 on the sides 82 at the rearward portion thereof for attachment to the flanges 32 of the side panels 26 and the receiver tray is tilted forwardly and downwardly in the range of 10 degrees to 30 degrees from the horizontal. One side 82 is extended, and hinges 86 are provided on the lower edge thereof in order to allow the bottom 90, indicated in Figure 4, and the other side 92, indicated in Figure 1, to pivot downwardly therefrom, thus allowing easy removal of slides 224 stacked therein.

Each flange 42 has a portion extended a relatively large distance forwardly thereof, said portions comprising brackets 98 as best shown in Figures 6, 7 and 8, for mounting the feed mechanism 14.

Another bracket 100, best illustrated in Figure 4 and mounted on and extending upwardly from the panel 28, is provided to hold a reflector 102 in axial alignment with the viewing aperture 48 and two condensing lenses 104 therebetween. A portion of each lens 104 extends through notches in vertical plates 108 attached to the side panels 26 and extending upwardly therefrom.

A socket 110, also mounted on the panel 28 is provided to hold a lamp 112 with the point of maximum intensity thereof coinciding with the focal point of the reflector 102.

Slide feed assembly

Two parallel feed arms 120 are rigidly mounted on a shaft 122 which extends transversely through the mounting brackets 98. One end of the shaft 122 is further extended through the housing 22, and an operating lever 124 is mounted thereon as indicated in Figure 1. The arms 120 are spaced on the shaft to lie adjacent the brackets 98 and slightly inwardly therefrom. A rocker arm 126 is pivotally mounted at the end of each arm 120 substantially normal to the axis thereof. A portion of each arm 126 is extended substantially beyond the adjacent guide 50 to provide a slide contacting tip 128. Small tension springs 130, extending between the arms 120 and the ends 132 of the rocker arms 126 opposed to the tips 128, serve to bias rollers 134, mounted on the tips 128, radially outward against the under sides 136 of the guide flanges 50.

A roller or tip-retracting member 138 attached to the under sides 136 at the upper portion of the guide flanges 50 serves to retract the tips 128 and prevent undue wear on the slides 54 on the loading or up-stroke of the feed arms 120 from the position shown in Figure 2.

Rachet cams 140 on the shaft 120 externally of the brackets 98 are provided with nodes 142 which move push-rods 144 radially of the shaft 120. The push rods 144 extend, through guides 146 attached externally of the brackets 98, upwardly and rearwardly from the cams 140 to engage crank arms 148 of a magazine ejector 150.

The magazine ejector 150 is mounted transversely of the magazine 52 adjacent to the edge 56 and slightly rearwardly therefrom, and comprises a shaft 152 extending through lugs 154 extended rearwardly from the sides 70 slightly above the edge 56. The crank arms 148 extend radially upward and forward of the shaft 152 outwardly of the lugs 154 and the upper end 156 of each pushrod 144 is pivotally attached thereto.

Figure 3:
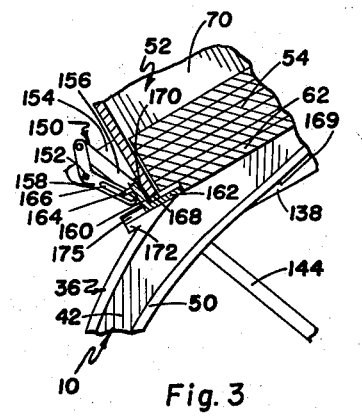
Figure 3 is a view similar to Figure 2 and showing the magazine ejector and associated parts in a second position.

Pivot arms 158 affixed to the shaft 152 and depending therefrom engage upstanding flange portions 160 on an ejector blade 162. Pins 164 extending laterally outward of the flanges 160 are engaged in longitudinal slots 166 in the pivot arms 158, thus allowing the blade 162 to be moved forwardly through a slot 168 at the edge 56 and contact the lowermost slide 62 without tilting of the blade 162. The slot 168 extends the full width of the magazine 52, and the blade 162 is of a length to contact substantially the full width of a slide 62, in edge abutting relationship, thus preventing injury to the slide 62. A leaf spring 170 compressed between the flange 160 and the magazine 52 serves to return the blade 162 to inoperative position after release of the lowermost slide 62 from the magazine. Rearwardly extending portions 172 of the guide members 36 serve as supports for the blade 162, and the portions 172 also have side flanges 175, one of which is indicated in Figure 3 only, acting as guides on rails for the ends of the blade 162, thus preventing tipping thereof as the blade is urged forwardly into the slot 168.

Springs 169, attached to the under side of the guide flanges 50 adjacent the tip-retracting members 138, extend forwardly therefrom, and extend upwardly through slots 171, indicated in Figure 2, in the ends of the guide flanges 50. The end portions 173 of the springs 169 are bent to lie in substantially co-planar relationship with the flanges 50, and are depressed when the lowermost slide 62 is moved by the blade 162. The springs 169 aid in tilting the forward edge of the slide 62 upwardly so that the slide will lie against the guide flanges 50.

It now can be clearly seen that the rotation of the cams 140, when the feed arms 120 are lifted by means of the external operating lever 124, moves the push rods 144 longitudinally, oscillating the shaft 152 and moving the ejector blade 162 through the slot 168, moving the lowermost slide 62 forwardly of the magazine 52 through the exit slot 68, so that the slide clears the retaining lips 60 and lies on the bent portions 66 of the guide flanges 50. The nodes 142 are so spaced on the cams 140 as to move the push rods 144 when the feed arms 120 reach the position as shown in Figure 4, ejecting the slide 62 and retracting to inoperative position while the arms 120 complete their forward throw. On the rearward throw of the arms 120 the tips 128 engage the uptilted edge of the ejected slide and the rearward edge of the slide is now well beneath the lip 60, thus precluding the possibility of jamming the slide 62 between the blade 162 and the tip 128.

Upon release of the lever 124, the feed arms 120 are pivoted downwardly by the action of springs 174 attached to the arms 120 and the brackets 98, carrying the slide 62 downwardly between the guide members 36 and the guide flanges and into viewing position, as indicated by the numeral 176, in correct alignment with the aperture 48.

Leaf springs 178 having one end affixed to the mounting brackets 98, adjacent the lower end of the flanges 50, extend downwardly therefrom to engage pressure plates 179, said plates having a forwardly extended ear 180 for attachment to the springs 178. Each plate 179 is positioned in vertical alignment with the adjacent portions of the guide members 36 and on the forward side thereof and each plate 179 is further provided with end portions 181 curved slightly away from the guide members 36. The leaf springs 178 bias the pressure plates 179 firmly against the slide 176, assuring sharp, accurate focusing of a projected image. The pressure plates 179 are vertically mounted adjacent guide members 36 and in lateral alignment with the aperture 48 and these plates 199 hold the viewed slide 176 securely in position by means of the leaf springs 178 extending therefrom to the brackets 98.

The upper horizontal brace 46 extends slightly above the slide 176, contacting the tips 128 and constitutes a stop therefor, the inertia of the first slide 176 being depended upon to carry the slide into the correct viewing position by a slight overtravel beyond the lowermost position of the tips 128, the motion of each succeeding slide being stopped by the preceding slide which is in the reviewing-stacking position which will be discussed hereinafter.

*Stacking assembly*

Stacker operating rods 182 having tips 184 contacting portions of the cams 140 and extending downwardly and rearwardly therefrom, through guides 186 mounted on the brackets 98, pivotally engage the upper ends 188 of rocker arms 190 which are freely pivotable about a reviewer shaft 192 disposed transversely of the body 24 slightly below and slightly forward of the panel 28. The body 24 is somewhat wider than the spaced guide members 36 to admit the rods 182 between the side panels 26. Each rocker arm 190 has a horizontal portion 194 extending toward the vertical center plane of the body 24 and a portion 196 extending downward. Stacker links 198, pivotally attached to the lower end of each rocker arm 190 extend forwardly and downwardly therefrom to engage legs 202 which are pivotally mounted on a stacker shaft 204 and extend upward therefrom. The shaft 204 lies transversely of the body 24 a distance rearwardly of the forward ends 34 and below the guide members 36. Stacker blades 206, being simply forwardly extended portions of the legs 202, are so proportioned as to enter the receiver tray 40, between the guide members 36 when the shaft 204 is moved to one position.

The blades 206 are so proportioned and the legs 202 so pivoted as to bring the lowermost point of the blade 206 first into contact with the slide 222, urging the bottom of said slide toward the tray 40, and allowing the top of said slide to drop slightly from contact with the slide 176, before the top portion of the slide 222 is forced to move toward the tray. This prevents slide 222 from interfering with and shifting slide 176 out of position and prevents jamming or malfunctioning of the projector.

The links 198 have longitudinal slots 208 adjacent the legs 202, said slots lying above the longitudinal axes of the links, and the links 198 are also provided with notches 210 below and communicating with the forwardly disposed ends of the corresponding slots 208. Pins 214 on each leg 202, slightly above the shaft 204, are biased into firm engagement with the notches 210 by means of leaf springs 216 mounted on the legs 202 and urging the links 198 upwardly until such time as it becomes necessary or desirable to render the stacker blades 206 inoperative, as will be fully disclosed hereinafter. The blades 206 are further provided with arcuate flanges 218 on the rearwardly disposed edges thereof, the purpose of which will also become evident hereinafter.

As best illustrated in Figure 6, retainers 219, pivotally mounted on the brackets 98, are provided with curved slide contacting portions 220, and are biased by the springs 223 to hold the slide 222 against the stacker blades 218 as said blades are moved forwardly to place the slide 222 into the receiver tray 40. The slide 222 is held by the retainers 219 in proper abutting relation with the viewed slide 176. The slide contacting portions 220 are curved to provide a rolling, rather than a dragging action against the slide 222 as the retainers 219 are pivoted upwardly and forwardly by the slide 222 as the latter moves forwardly under the influence of the stacker blades 218. When the slide 222 has moved beyond the reach of the retainers and is deposited in the receiver tray 40, the retainers are returned, on the action of springs 223, to the position as shown in Figure 4, awaiting the entry of the slide moving downwardly from the viewed position.

Figure 5:
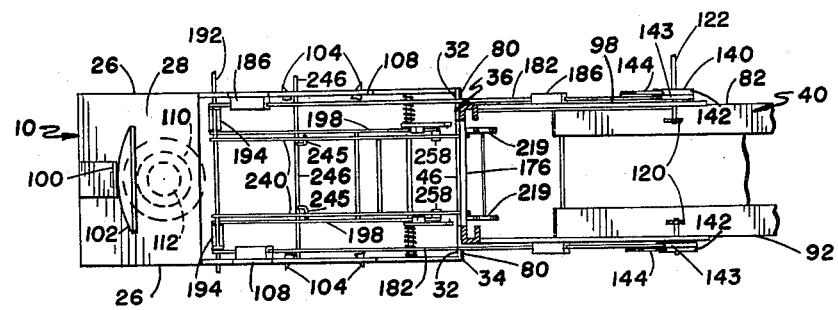
Figure 5 is a view taken on the line 5—5 of Figure 4.
Figure 12:
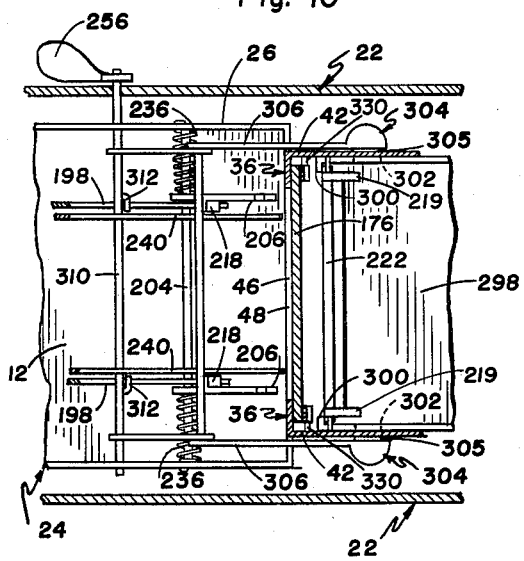
Figure 12 is a view taken on the line 12—12 of Figure 11.
Figure 13:
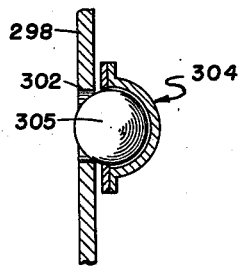
Figure 13 is a greatly enlarged sectional view of the ball connection between the modified ejection mechanism and the modified receiving tray.

Springs 236, shown best in Figures 5 and 12, encircling the stacker shaft 204 outwardly of the legs 202, and having one end fixed to the side panels 26, return the stacker blades 206 to inoperative position after the slide 222 has been deposited in the tray 40, thus also maintaining contact of the tips 184 with the cam 140.

Additional nodes 143, angularly offset from the nodes 142, are provided on the cam 140, to actuate the rods 182 as the feed arms 120 are lifted from the position of Figure 2.

The purpose of the stacking assembly 16 now becomes clear. As the cams 140 of the feeding assembly 14 are actuated, a node 143 on each cam moves the operating rods 132 rearwardly, pivoting the ends 188 of the rocker arms 190 forwardly about the reviewer shaft 192, and moving the links 198 forwardly and pivoting the legs 202 forwardly about the shaft 204. Thus, a slide 222 in the review position is urged from said position into stacked relation in and in slightly inclined position in the receiver tray 40. The slides 224 are maintained in stacked relation in the tray 40, by means of a friction stop 226 illustrated in Figure 4, comprising a clamp plate 228, a guide plate 230, the back plate 234 being bent substantially normal to the plane of the bottom 90 of the tray and constituting a rest for the slides 224.

Again, the tips 184 and the nodes 143 are so related as to provide the desired complete cycle of movement of the blades 206, said blades 206 depositing the slide 222 in the tray 40, and returning to inoperative position, as shown in Figure 4, before the uppermost position of the feed mechanism 14 is reached, thus preventing the viewed slide 176 from jamming against the blades 206 before said blades 206 are fully retracted, when said viewed slide 176 is being urged downwardly into the review position 222.

Review assembly

One end of the shaft 192 is extended through the housing 22 and an operating lever 238 is mounted thereon. A pair of parallel review arms 240, each having one end firmly affixed to the shaft 192, extend normally forwardly therefrom between the legs 202 slightly below the slide 222. The retainer 219 holds the slide 222 in proper abutting, co-planar relationship with the slide 176 for review purposes. A brace rod 242, best indicated in Figure 6, attached to and extending between the arms 240 provides a means of attaching one end of a single tension spring 244 to influence both arms downwardly into inoperative position against stop portions 245 of an ejector operating shaft 246, the other end of the spring 244 being attached to the base 12. The rotation of the lever 238, to produce an upward motion of the arms 240, brings the ends 248 into contact with the bottom of the slide 222, lifting the slide 222 and the slide 176 upwardly, and also lifting the feed arms 120 and extending the springs 130, until the slide 222 attains the position of the viewed slide 176, as clearly shown in Figure 7.

Lock pins 250 affixed to the arms 240 extend outwardly therefrom to lie closely adjacent the flanges 218 and forwardly thereof when said arms 240 move through the arc of the review cycle, thus locking the blades 206 and preventing serious damage to the slide 222, or at least jamming of the device due to inadvertent motion of the lever 124 during the review cycle. Lips 252 extending upwardly from the ends 248 of the arms 240 engage the face 254 of the slide 222 and prevent the slide 222 from tilting forwardly at the bottom at the start of the review cycle.

Upon release of the lever 238, the slides 176, 222 are returned to position as shown in Figure 4 by the action of the springs 174 and the spring 244.

Ejector mechanism

As most clearly illustrated in Figures 6 and 8, the ejector shaft 246, when actuated by the lever 256, rotates the stop portions 245 from contact with the arms 240, thus releasing the arms 240 from the lowermost review position to be influenced downwardly by the spring 244 into contact with flanges 258 extending inwardly from the ends of the stacker links 198, and moving the links 198 slightly downwardly until the pins 214 are released to slide in the slots 208, thus disengaging the stacker blades 206.

On the downward travel of the arms 240, hooks 260 on the lower ends of trap door links 262 are also engaged in notches 264 on the arms 240, below the lips 252. The links 262 are frictionally pivoted on a pair of opposed trap doors 266, pivotally mounted on the side panels 26 and disposed to close the lower ends of the guide members 36, these doors being positioned so that the review arms 240 will clear them. The trap doors 266 serve as lower stops for the slide 222 when the doors are in the normally closed position, and the doors are urged into this closed position by springs, not shown, operatively mounted on the pins 272.

The hooks 260 engage in the notches 264 and pivot the doors 266 downwardly about the pins 272, thus providing an escape slot 276 immediately below the slide 222. Thus, a slide may be ejected from the device, in the next cycle, simply by lifting the lever 256.

The door 266 is provided with a forwardly extending portion 278 which is disposed in parallel relationship with the bottom 90 of the tray, the upper surface of the portion 278 being in co-planar relationship with a lip 280 on the rear end of the bottom 90 of the tray. The portion 278, therefore constitutes a ramp to guide the slides over the lip 280 and the lip thereafter holds the slides against escape from the rearward end of the tray.

The housing 22, as shown in Figure 1, comprises two halves 282 which substantially enclose the complete mechanism. Openings 284 are provided to allow the magazine 52 and the receiver tray 40 to extend therethrough. Lugs 286 and screws 288 provide means of securing the halves 282 together. Another screw 290 extends through the housing and into a flange 292 of the focusing lens assembly 294 to maintain the lens in exact alignment with the aperture 48.

Figure 10:
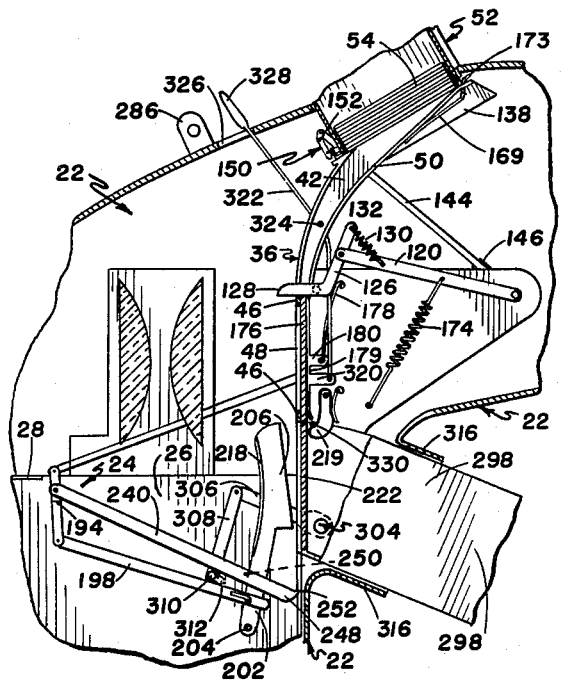
Figure 10 is a fragmentary, sectional view of the projector mechanism including a modified form of the ejection mechanism and receiving tray.
Figure 11:
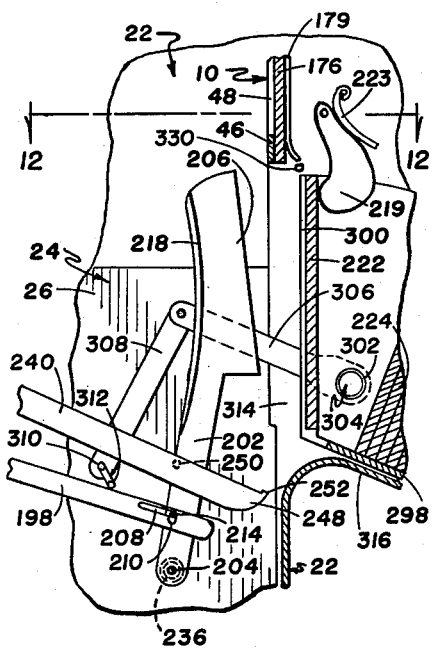
Figure 11 is a greatly enlarged, fragmentary view of the modified ejector in operative position.

Figures 9, 10, 11 show a modification of the ejector assembly 20 in which a removable tray 298 is provided with inwardly extending flanges 300, said flanges replacing the portion of the guide members 36 occupied by the slide 222. Bores 302 in the vertical sides of the tray 298, engage ball connectors 304 mounted in the forwardly disposed ends of ejector arms 306, said ball connectors 304 each having a metallic ball 305 retained therein to engage the bores 302. The arms 306 extend rearwardly substantially parallel to the axis of the tray 298, to pivotally engage the upper ends of ejector bars 308 having the lower ends thereof fixed normally to an ejector shaft 310, said shaft having lugs 312, replacing the stop portions 245 of the prior described embodiment, and these lugs 312 contact and move the stacker links 198 downwardly, thus disengaging the blades 206 as previously disclosed herein.

It can now be clearly seen that rotation of the shaft 310 both disengages the stacker blades 206, and moves the tray 298 forwardly of the device to provide an escape slot 314 between the flanges 300 and the body 24. In this modification, the housing 22 is provided with a forwardly extended portion serving as a guide channel 316 for the tray 298.

A manual release for the final slide reaching the viewing position 176 is provided, since ordinarily the feed assembly 14 brings another slide into contact with the slide in the gate urging the same into the review or stacking position indicated by the slide 222. To this end, a second lug 320 is provided on each of the pressure plates 179. A lever 322, engaging each lug 320, extends upwardly therefrom and is pivoted on the flange 42 as at 324, said levers 322 converge above the guide members 36 and extend through a slot 326 in the housing. Thus, it can be clearly seen that rearward pressure on a handle 328 provided on the levers 322, externally of the housing 22, moves the pressure plates 179 rearwardly, the lower curved end portions 181 contacting and pivoting the retainers 219 rearwardly, allowing the slide 176 to drop unhindered into the review or stacking position, indicated by the slide 222. Stops 330 are provided as indicated in Figures 4, 6, 8 and 10, spaced very slightly rearwardly of the position of the slide 222 to engage the retainers 219 so that these retainers do not normally frictionally contact the slide in the reviewing position until the re-stacker operates thereon. However, thicker slides must depend on the action of the curved lower end of the focusing plate on the retainers 219 to release these thicker slides for ejection. The lugs 320 are positioned below the lugs 180 on the pressure plates 179, thereby preventing undue tilting of said plates on contact with the retainers 219.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. In a slide projector, a slide feeding assembly comprising: a magazine for a stack of slides, a projection gate, a fixed slide guide leading from said magazine to said gate, and elongated transversely of the magazine; said magazine having an open discharge end leading directly into said guide; a slide-engaging lip at one side of the magazine adjacent said guide and extending into the magazine; said assembly having an opening at the side of the magazine opposite to said lip and dimensioned to accept an edge portion of a single slide; a feed arm; means to move said feed arm with reference to said lip to dislodge slides one at a time from engagement with said lip and into said opening; and means for directly contacting one edge only of the dislodged slides and pushing the same rectilinearly along said guide in the direction of said gate.

2. An assembly according to claim 1 wherein said guide is generally arcuate, and said means comprises an arm having a slide-engaging tip; said arm being mounted for pivotal movement with said tip following said arcuate guide.

3. An assembly according to claim 2 wherein said guide includes a track; said means including an arm having a slide-engaging tip resiliently mounted thereon; said tip having means to guide the tip along said track; and said track having a tip-retracting member between said lip and said opening; whereby the pressure of said tip on the lowermost slide in the magazine on the return stroke of the arm is limited.

4. In a slide projector, a slide feeding assembly comprising: a magazine having an open, discharge end; a fixed slide guide extending across said open, discharge end and defining with one side of said magazine an opening dimensioned to accept an edge portion of a single slide; a small lip in substantially opposed relation to said opening at the opposite side of said magazine and extending into said open, discharge end; a blade; means to move said blade with reference to said lip to dislodge slides, one at a time, from engagement with said lip and into said opening; and means to move the dislodged slides in the opposite direction along said guide.

5. In a slide projector, a slide feeding assembly comprising: a magazine for a stack of slides, a projection gate, a fixed slide guide leading from said magazine to said gate, and elongated transversely of the magazine; said magazine having an open discharge end leading directly into said guide; a slide-engaging lip at one side of the magazine adjacent said guide and extending substantially transversely of the magazine; said assembly having an opening at the side of the magazine opposite to said lip and dimensioned to accept an edge portion of a single slide; a blade; means to move said blade with reference to said lip and into said opening; and means for driving the dislodged slides along said guide to said gate; said last mentioned means comprising an arm having a slide-contacting tip; structure constituting an extension of said guide beyond said gate and comprising holding means to retain a viewed slide in a position at the side of said gate remote from the magazine; means for driving a slide in said position in a reverse direction out of said structure back into said gate for reviewing; a slide re-stacking assembly comprising a tray at one side of said structure, and means for translating a slide in said position into said tray; said holding means including a shiftable stop at the end of said structure remote from said gate; said stop comprising means for holding a viewed slide in said position for alternative reviewing and re-stacking; said stop being shiftable to inoperative position for ejection of an unwanted slide.

6. In a slide projector, a slide feeding assembly comprising: a magazine for a stack of slides, a projection gate, a fixed slide guide leading from said magazine to said gate, and elongated transversely of the magazine; said magazine having an open discharge end leading directly into said guide; a slide-engaging lip at one side of the magazine adjacent said guide and extending substantially transversely of the magazine; said assembly having an opening at the side of the magazine opposite to said lip and dimensioned to accept an edge portion of a single slide; a blade; means to move said blade with reference to said lip and into said opening; means for driving the dislodged slides along said guide to said gate; said means comprising an arm having a slide-contacting tip and a spring biasing said arm and tip toward said gate; structure constituting an extension of said guide beyond said gate and comprising holding means to retain a viewed slide in a position at the side of said gate remote from the magazine and in abutting relationship with the next succeeding slide; and means to return a slide from said position to said gate with displacement of any slide in the gate against the action of said spring.

7. Apparatus according to claim 6 wherein the last mentioned means comprises a member mounted to engage a slide in said position and to traverse said structure; said spring constituting means to return slides in said guide and gate to said gate and said position, respectively, when said member is moved to inoperative position.

8. Apparatus according to claim 5 and including means for disengaging said re-stacking means when said means for returning is operating.

9. Apparatus according to claim 5 wherein said stop is a trap door defining a ramp guiding slides into said tray, when the trap door is in operative position.

10. Apparatus according to claim 5 wherein said tray has a lip at end thereof adjacent said door, and said door also constitutes a ramp guiding the slides over said lip, as the slides enter the tray.

11. Apparatus according to claim 5 wherein said structure comprises portions of said tray.

12. Apparatus according to claim 9 wherein said tray is longitudinally shiftable and said stop is integral with said tray.

13. An assembly according to claim 1 wherein the effective movement of said element is in a direction substantially the reverse of the direction of movement of said dislodged slides along said guide.

14. Apparatus according to claim 5 and including a pressure plate operatively mounted at said gate for marginally contacting and biasing slides at said gate in one direction normal to the general plane of said gate and to facilitate accurate focusing; and manually operated means to release said pressure plate, whereby the last slide of a series can be released for movement toward said position.

15. Apparatus according to claim 5 wherein said stop is at the lower end of said structure; a member operatively mounted for resiliently restraining the upper portion of a slide at said position from movement toward said tray;

and means to release said member, whereby an unwanted slide may be released for ejection by gravity when said stop is also moved to an inoperative position.

16. Apparatus according to claim 5 and wherein said means for translating comprises a blade pivotally mounted for movement toward and away from said tray; said blade being disposed to engage first the bottom edge portion of a slide in said position as the blade travels toward said tray, whereby a slide in said position is first tilted to release the same from contact with a slide in said gate.

17. Apparatus according to claim 5 and including means to prevent simultaneous operation of said means for translating and said means for driving a slide in a reverse direction.

18. Apparatus according to claim 5 and including a member operatively mounted for resiliently restraining the upper portion of a slide at said position thereof from movement toward said tray; and means to release said member, whereby an unwanted slide may be released for ejection when said stop is also moved to an inoperative position; said member for restraining the upper portion of a slide also constituting a guide for a slide entering into said position thereof.

19. In a slide projector, a slide feeding assembly comprising: a magazine for a stack of slides, a projection gate, a fixed slide guide leading from said magazine to said gate, and elongated transversely of the magazine; said magazine having an open discharge end leading directly into said guide; a slide-engaging lip at one side of the magazine adjacent said guide and extending into the magazine; said assembly having an opening at the side of the magazine opposite to said lip and dimensioned to accept an edge portion of a single slide; a feed arm; means to move said feed arm with reference to said lip to dislodge slides one at a time from engagement with said lip and into said opening; and means for tilting the dislodged slide about an axis adjacent said opening; and means for driving the dislodged, tilted slide rectilinearly along said guide toward said gate.

20. In a projector: a projection gate; a slide guide to guide a slide into said gate; an impositive drive means to drive slides along said slide guide into said gate; structure constituting an extension of said guide beyond said gate to retain a viewed slide in a position at the discharge side of said gate and in edge abutting relationship with the next succeeding slide; and means to return a slide from said position with simultaneous displacement of any slide in said gate against the action of said impositive drive means.

References Cited in the file of this patent

UNITED STATES PATENTS

| | | |
|---|---|---|
| 1,049,196 | Bauer | Dec. 31, 1912 |
| 1,165,318 | Carver | Dec. 21, 1915 |
| 2,486,841 | Harris et al. | Nov. 1, 1949 |
| 2,503,239 | Antos | Apr. 11, 1950 |
| 2,532,775 | Leonard | Dec. 5, 1950 |
| 2,593,007 | Cadwell et al. | Apr. 15, 1952 |
| 2,594,162 | Hartley | Apr. 22, 1952 |
| 2,671,378 | Burla | Mar. 9, 1954 |
| 2,705,437 | Lessman | Apr. 5, 1955 |

FOREIGN PATENTS

| | | |
|---|---|---|
| 729,514 | Germany | Dec. 17, 1942 |